US006545738B2

United States Patent
Son et al.

(10) Patent No.: US 6,545,738 B2
(45) Date of Patent: Apr. 8, 2003

(54) FERROELECTRIC LIQUID CRYSTAL DISPLAY AND METHOD FOR FABRICATING THE SAME USING OPPOSITE POLARITY SPLIT LAYER ELECTRODES

(75) Inventors: Hyeon Ho Son, Kyounggi-do (KR); Su Seok Choi, Kyounggi-do (KR); Jong Jin Park, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/893,986

(22) Filed: Jun. 29, 2001

(65) Prior Publication Data

US 2002/0012092 A1 Jan. 31, 2002

(30) Foreign Application Priority Data

Jul. 31, 2000 (KR) .......................... 2000-44443
Jun. 27, 2001 (KR) .......................... 2001-37132

(51) Int. Cl.⁷ ................................ C09K 19/02
(52) U.S. Cl. ........................ 349/172; 349/188
(58) Field of Search ................. 349/33, 34, 84, 349/85, 123, 144, 173, 179, 184, 129, 172, 188

(56) References Cited

U.S. PATENT DOCUMENTS

| 4,697,887 A | * | 10/1987 | Okada et al. | ............... 350/350 |
| 5,808,716 A | * | 9/1998 | Gass et al. | ................... 349/124 |
| 5,818,560 A | * | 10/1998 | Kouno et al. | ............... 349/129 |
| 6,108,061 A | * | 8/2000 | Sako et al. | ................... 349/85 |
| 6,344,889 B1 | * | 2/2002 | Hasegawa et al. | .......... 349/129 |

OTHER PUBLICATIONS

Nonaka, Toshiaki, *Monthly Display Journal*, Apr. 2001, pp. 29–34.

Asao, Yasufumi, et al., "Novel Ferroelectric Liquid Crystal Mode for Active Matrix Liquid Crystal Display Using Cholesteric–Chiral Smectic C Phase Transition Material," *Japanese Journal of Applied Physics*, vol. 38 (1999), pp. 5977–5983, Part 1, No. 10, Oct. 1999.

Furukawa, Tomoo, et al., "TFT–FLC with High Quality Moving Picture and High Contrast Ratio," *IDW*, 2000, pp. 251–254.

* cited by examiner

*Primary Examiner*—Robert H. Kim
*Assistant Examiner*—Timothy Rude
(74) *Attorney, Agent, or Firm*—Morgan, Lewis & Bockius LLP

(57) ABSTRACT

A liquid crystal display device and a method for fabricating a liquid crystal display device wherein two domains are provided within each pixel cell so as to prevent flicker and to widen a viewing angle. In the liquid crystal display device, a common electrode is formed on a first substrate in such a manner to be divided into at least two electrodes. An alignment film is coated on the first substrate provided with the common electrode and a second substrate. A ferroelectric liquid crystal layer is injected between the first substrate and the second substrate to form at least two domains having a liquid crystal alignment state opposed to each other on a basis of a dividing line of the common electrode.

16 Claims, 13 Drawing Sheets

FERROELECTRIC LIQUID CRYSTAL DISPLAY AND METHOD FOR FABRICATING THE SAME USING OPPOSITE POLARITY SPLIT LAYER ELECTRODES

This application claims the benefit of Korean Patent Application Nos. P2000-44443 and P2001-37132 filed Jul. 31, 2000 and Jun. 27, 2001, which is hereby incorporated by reference.

BACKGROUND OF THE INVENTION

1. Field of the Invention

The present invention relates to a liquid crystal display, and more particularly, to a liquid crystal display having reduced flicker and wide a viewing angle. The present invention also relates to a method of fabricating the above-mentioned liquid crystal display having reduced flicker.

2. Description of the Related Art

A ferroelectic liquid crystal (hereinafter, "FLC") has a response time faster than other liquid crystal modes, as about several ten micro seconds to several mile seconds. This results from that the FLC has a spontaneous polarization characteristic without an electric field. The FLC also is able to realize a wide viewing angle without a special electrode structure and/or a compensating film, as such an In-plane Switching (IPS) mode. Accordingly, the FLC is spot-lighted because of being applied to a motion picture display representing a liquid crystal television.

The liquid crystal mode using such a FLC includes a deformed helix FLC (DHFLC), a surface stabillized FLC (SSFLC), an anti-FLC (AFLC), a V-shape FLC, a half V-shape FLC and so on. Since liquid crystal molecules in FLC mode among the above liquid crystal modes have only a bi-stable state, the SSFLC mode can be driven in a On/Off and has a disadvantage that it's impossible to realize a gray scale. Meanwhile, the V-shape and half V-shape FLC modes allow the gray scale to be realized, because the liquid crystal molecules each has a mono stable state. In view of this point, the V-shape and half V-shape FLC have been actively studied. Furthermore, the half V-shape FLC has a primary alignment state better than that of the V-shape FLC. Therefore, the half V-shape FLC enhances a contrast ratio and enables the liquid crystal to be easily driven.

The half V-shape FLC uses a chiral smetic C (hereinafter, Sm C*) phase maintained at a normal temperature in a temperature induced phase transition process. Conventionally, in accordance with a temperature which becomes lower, the half V-shape FLC has a phase-transition in a sequence of a isotropic (hereinafter, "I") phase→a chiral nematic (hereinafter, "N*") phase→Sm C* phase→a crytal, as shown in FIG. 1. Referring to FIG. 1, if the temperature is low from a temperature maintaining the isotropic phase which does not have a director and a directional order, the liquid crystal molecules are aligned in the N* phase having the director. In sequence, when the temperature is lower than that of the N* phase, the liquid crystal molecules are aligned in the Sm C* phase having a constant director and a directional order, that is, a layer structure and a special tilt. When the phase of the liquid crystal is changed from the N* to the Sm C* through a smetic A phase, that is, at a second phase transition, a chevron or a bookself is formed to identify a layer normal direction with a rubbing direction, thereby allowing the liquid crystal molecules to be in the bi-stable state. In the bi-stable state, the liquid crystal molecules are stably positioned at both ends of a virtual cone. Meanwhile, in the liquid crystal having a phase transition sequence of the I phase→N* phase→Sm C* phase, a transition from the N* phase to the Sm C* phase as a first transition forces the liquid crystal layers to be inclined in two directions being symmetrized with a center at the rubbing direction, as shown in FIG. 2. At the phase transition from the N* phase to the Sm C* phase, if a direct current voltage is applied to the liquid crystal, only one of two layer directions is selected. Accordingly, the liquid crystal molecule in the Sm C* phase has the mono stable state forming an uniform alignment which a spontaneous polarization direction of the liquid crystal molecule identifies to a direction of electric field. The liquid crystal molecules of the mono stable state responds to an external electric field having a polarity contrary to that at the alignment and circles to draw an outer line of the virtual cone with a center in a normal line of a smetic layer, thereby controlling an amount of lights to be transmitted. As a result, the liquid crystal molecules in the mono stable state can realize the gray scale. A method of manufacturing the half V-shape FLC using such a phase transition process of the liquid crystal molecules will be described.

As shown in FIG. 3, a half V-shape liquid crystal cell includes liquid crystals injected between an upper substrate 1 and a lower substrate 11. The upper substrate is provided with a common electrode 3 and an upper alignment film 5 thereon, and the lower substrate 11 includes a thin film transistor array 9 and a lower alignment film 7. The thin film transistor array 9 and the lower alignment film 7 are disposed on the lower substrate 11. The liquid crystals are injected between the upper and lower substrates 1 and 11 at a temperature maintaining the N* phase or the isotropic phase, to be easy an injection of the liquid crystal. In sequence, if its temperature is low into a temperature allowing the liquid crystal to have the N* phase, the liquid crystal 15 are aligned in parallel with a rubbing direction of the alignment films 5 and 7, in a perpendicular direction. Then, an electric field is applied to the liquid crystal and the temperature is slowly low at the same time. To this end, the liquid crystal 15 changes into the Sm C* phase and become stable in the mono stable state having an uniform alignment which spontaneous polarization directions of the liquid crystal 15 are equal to a direction of the electric field, as shown in FIG. 3. Such a liquid crystal 15 being stable in the mono stable state responds to only an electric field having a polarity contrary to the electric field used at the alignment process. For example, if a negative polarity of electric field −E is applied to the liquid crystal 15 at the phase transition, the spontaneous polarization directions of the liquid crystal 15 are aligned to identify with a direction of the electric field −E. The liquid crystal 15 having such an alignment state are driven although the negative polarity of the electric field is applied to it. Accordingly, the liquid crystal 15 has a characteristic same as that of the primary alignment. Meanwhile, when a positive polarity of electric field +E is applied to the liquid crystals 15, the liquid crystal 15 is driven, that is, circles along with an outside of virtual cone structure by its spontaneous polarization. In other words, the alignment state of the liquid crystal 15 changes. Accordingly, it is possible to realize a continuous gray scale. As a result, the half V-shape mode of the liquid crystal 15 using a crossed polarizer have a characteristic of half V-shape voltage-transmission V-T as shown in FIG. 5.

Referring to FIG. 5, since the liquid crystal 15 of half V-shape mode, which a primary uniform alignment is formed by the negative polarity of electric field, are not driven, it is not almost the lights transmitted the liquid crystals 15. On and under the liquid crystal cell, there are disposed a first and a second polarizers having transmission axes orthogonal to each other. The first polarizer disposed under the liquid crystal cell has a transmission axis same as the primary alignment direction of the liquid crystal 15, and the second on the liquid crystal cell has another transmission axis orthogonal to the primary alignment direction of the liquid crystal 15. A linerly-polarization light passed the first polarizer is shielded by the second polarizer after transmitting the liquid crystal 15, thereby allowing a black state to be displayed.

On other hand, if the positive polarity of voltage is applied to the liquid crystal cell, the liquid crystal 15 of the half V-shape mode are driven to increase an amount of light transmitting the liquid crystal 15. Accordingly, the liquid crystal 15 of the half V-shape mode can realize the gray scale. This results from that the liquid crystals 15 driven by the positive polarity of voltage force a polarization direction of the linerly polarization light passed through the first polarizer to be changed in parallel with the transmission axis of the second polarizer such that the changed light is transmitted upwardly through the second polarizer.

As mentioned above, the liquid crystal 15 of the half V-shape FLC mode has a voltage-transmittance characteristic that the liquid crystal 15 respond to only any one of the positive and negative polarities. In order to prevent a deterioration of the liquid crystal, the half V-shape FLC is driven in a field inversion method as shown in FIG. 6. In this case, a brightness is charged during a driving voltage of one polarity, i.e., a driving voltage of positive polarity, is applied to the FLC, and not changed when a driving voltage of negative polarity is applied to the FLC, as shown in FIG. 7. Since the half V-shape FLC driven by the field inversion driving voltage enables a black state and a white state to be alternated, it is a disadvantage generating a flicker phenomenon. In order to prevent the flicker phenomenon, the half V-shape FLC must be driven in a high speed. In other words, a prior half V-shape FLC must be driven in a high speed of 120 Hz in order to display a 60 Hz of picture without the flicker phenomenon. However, the high-speed driving of the liquid crystal cell is limited and causes a rise in the cost of driving an IC by increasing the manufacturing cost of the LCD.

SUMMARY OF THE INVENTION

Accordingly, the present invention provides a liquid crystal display device and a method for fabricating a liquid crystal display device that substantially obviates one or more of the problems due to the limitations and disadvantages of the related art.

An object of the present invention is to provide a liquid crystal display device having reduced flicker and a wide viewing angle and preventing a flicker phenomenon in a half V-shape FLC.

Additional features and advantages of the invention will be set forth in the description that follows, and in part will be appeared from the description, or may be learned by the practice of the invention. The objectives and other advantages of the invention will be realized and attained by the structure particularly pointed out in the written description and claims hereof with the appended drawings.

To achieve these and other advantages and in accordance with the purpose of the present invention, as embodied and broadly described, a liquid crystal display device includes a first substrate; a second substrate; a first alignment layer on a first substrate; a common electrode on the second substrate, the common electrode is divided into at least two portions; a second alignment layer on the second substrate; and a ferroelectric liquid crystal layer between the first and second substrates, wherein molecules of the ferroelectric liquid crystal layer exist in at least two states having opposite alignment directions.

In another aspect, a liquid crystal display device includes a first substrate; a second substrate; an alignment layer on the first substrate; a common electrode on the second substrate; a second alignment layer on the second substrate; a ferroelectric liquid crystal layer having a photo-hardening material between the first and second substrates, wherein molecules of the ferroelectric liquid crystal layer exist in at least two states having different alignment directions.

In another aspect, a method for fabricating a liquid crystal display device includes the steps of forming a common electrode on a first substrate wherein the common electrode is divided into at least two portions; forming a first alignment layer on the first substrate having the common electrode; forming a second alignment layer on a second substrate; forming a ferroelectric liquid crystal layer between the first and second substrates to form a liquid crystal display panel; raising a temperature of the liquid crystal display panel; and applying a voltage to the at least two portions, the voltages having opposite polarities.

In another aspect, a method for fabricating a liquid crystal display device includes the steps of forming a first alignment layer on a first substrate; forming a common electrode on a second substrate, wherein the common electrode is divided into at least two portions; forming a second alignment layer on the second substrate; forming a ferroelectric liquid crystal layer having a photo-hardening material between the first and second substrates to form a liquid crystal display panel; raising a temperature of the liquid crystal display panel to a first level; applying a first voltage to the common electrode and lowering the temperature of the liquid crystal display panel to a second level; irradiating a first light onto a first area of the liquid crystal display panel to cure the photo-hardening material; raising a temperature of the liquid crystal display panel to a third level such that the ferroelectric liquid crystal layer in a second area of the liquid crystal display panel has a nematic (N*) phase; and irradiating a second light onto the second area of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
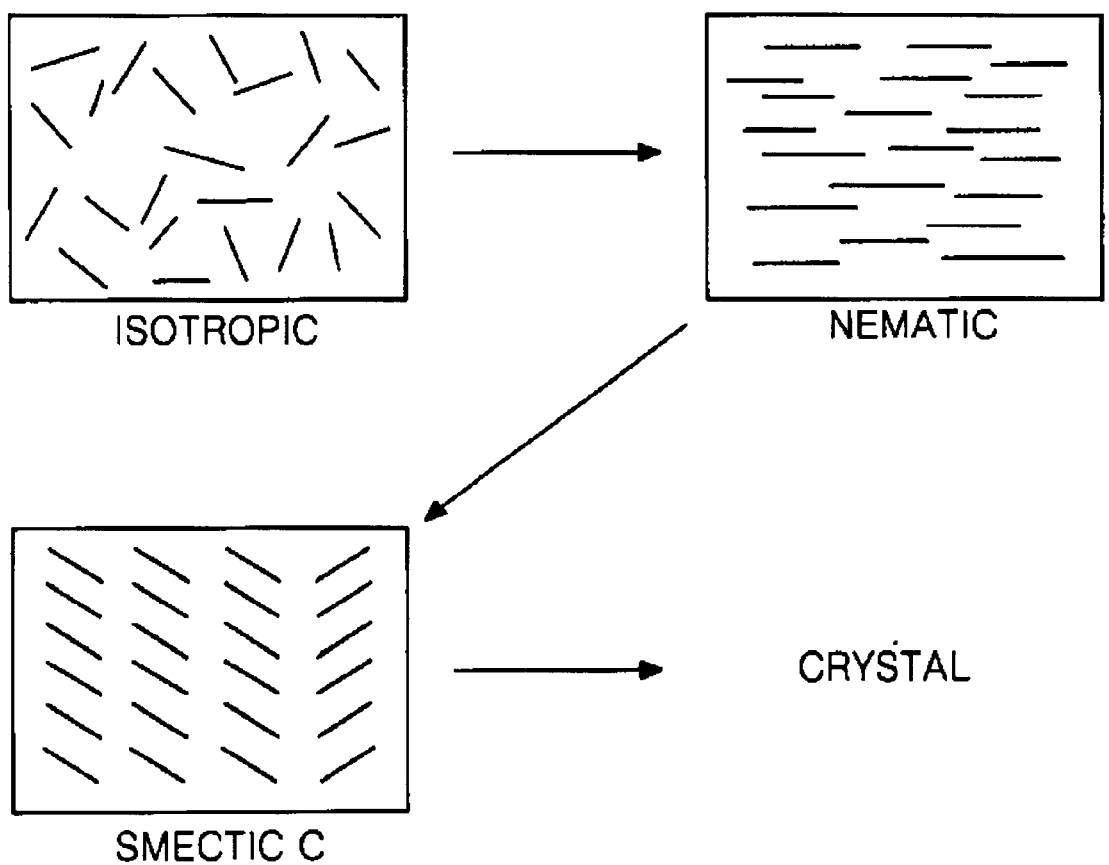
FIG. 1 shows a phase transition according to a temperature variation of a liquid crystal.
Figure 2:
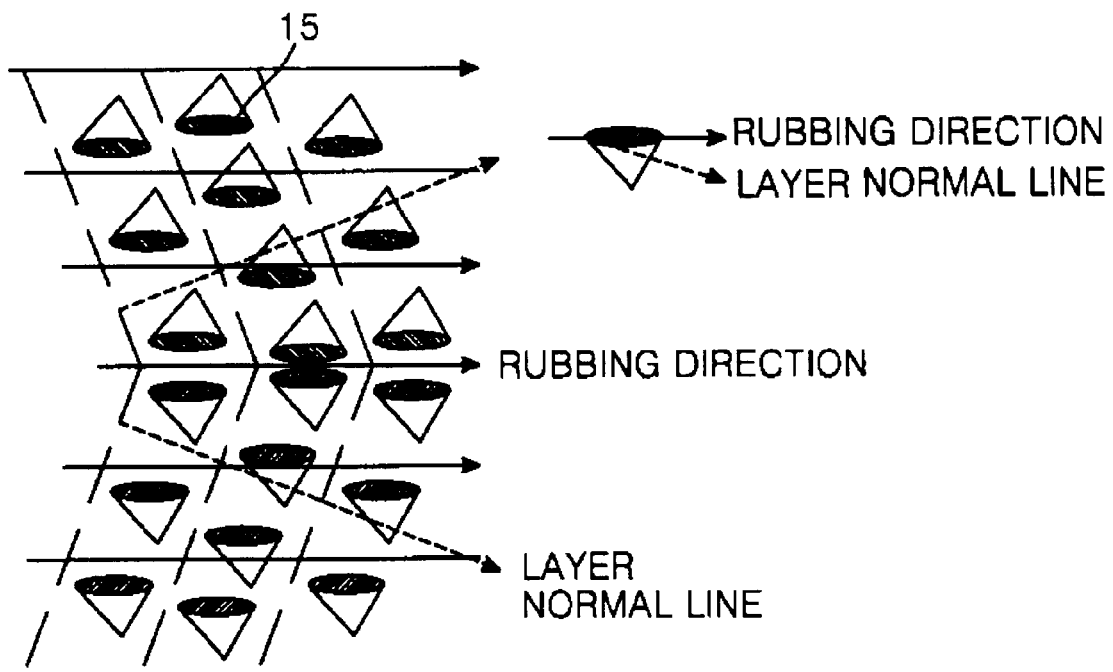
FIG. 2 shows a mono stable state of a half V-shape FLC mode.
Figure 3:
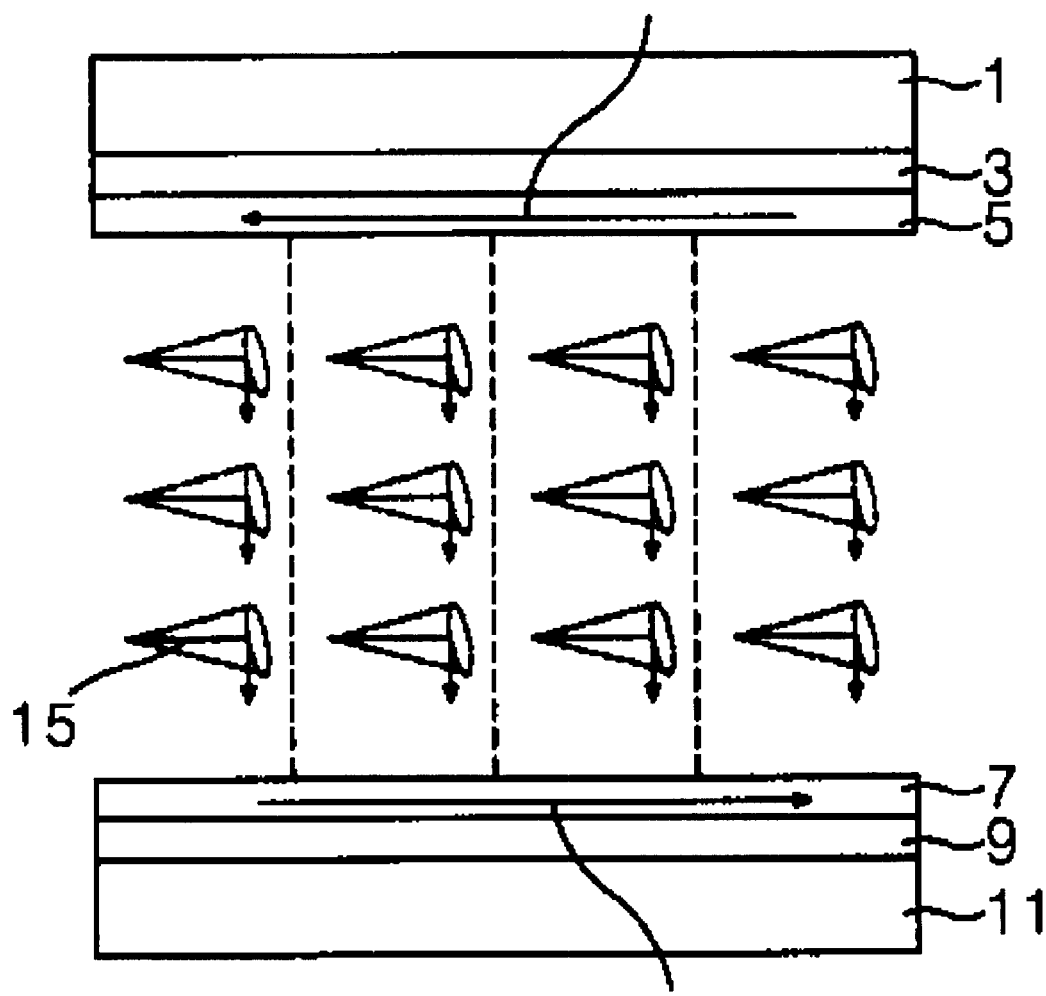
FIG. 3 is a sectional view showing a structure of a liquid crystal cell using the prior half V-shape FLC mode.
Figure 4:
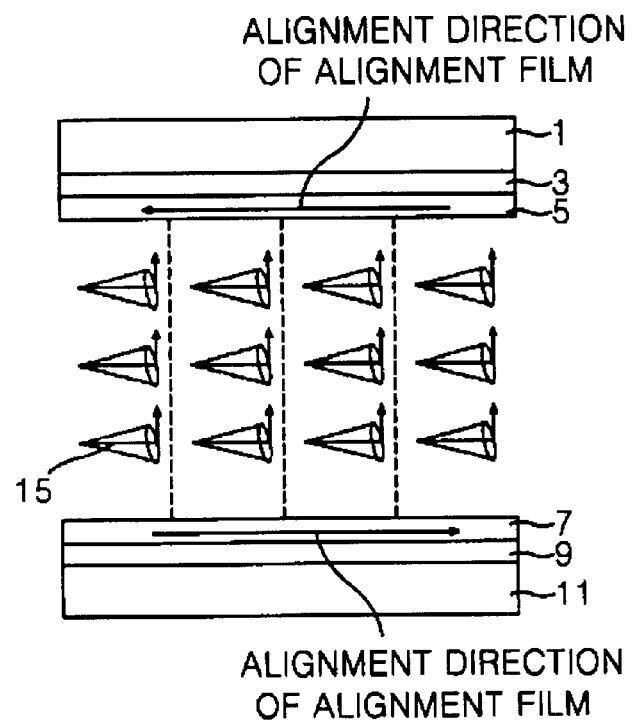
FIG. 4 is a sectional view showing a driving state of liquid crystal molecules when a positive polarity of voltage is applied to a liquid crystal cell of half V-shape FLC mode.
Figure 5:
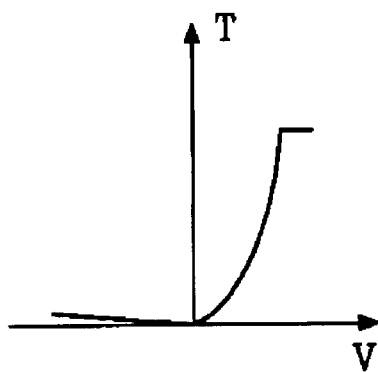
FIG. 5 is a co-ordinate graph explaining a voltage-transmittance characteristic of the prior half V-shape FLC.
Figure 6:
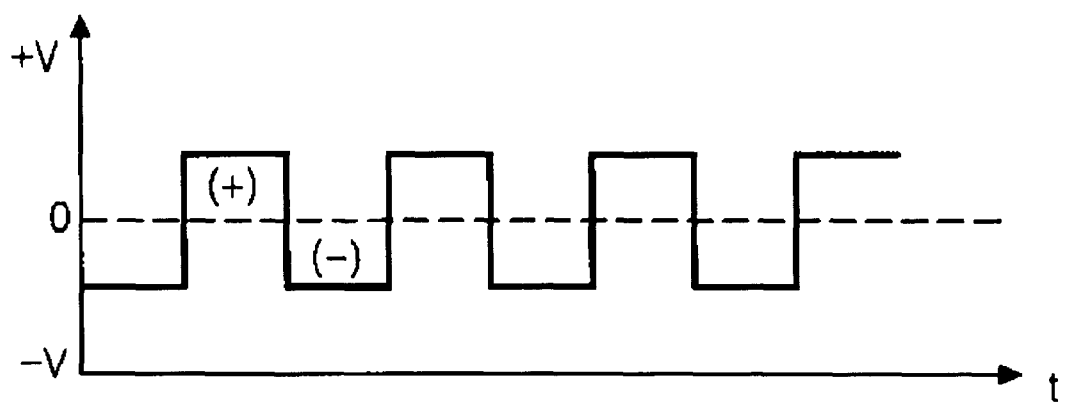
FIG. 6 is a waveform diagram of a voltage signal applied to the half V-shape FLC shown in FIG. 3 in a field inversion method.
Figure 7:
FIG. 7 is a brightness characteristic diagram of the half V-shape FLC shown in FIG. 3 related with the voltage waveform shown in FIG. 6.
Figure 8A:
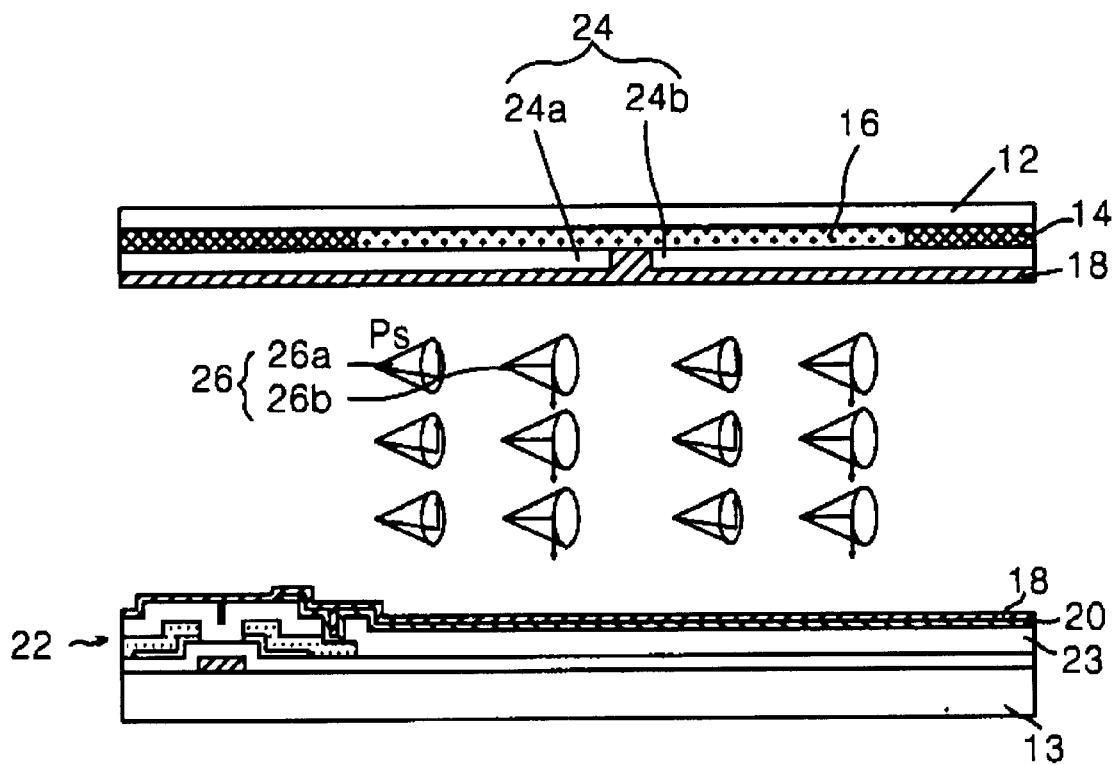
FIG. 8A and FIG. 8B are section views for explaining a method of fabricating a half V-shape FLC display device according to a first embodiment of the present invention.
Figure 8B:
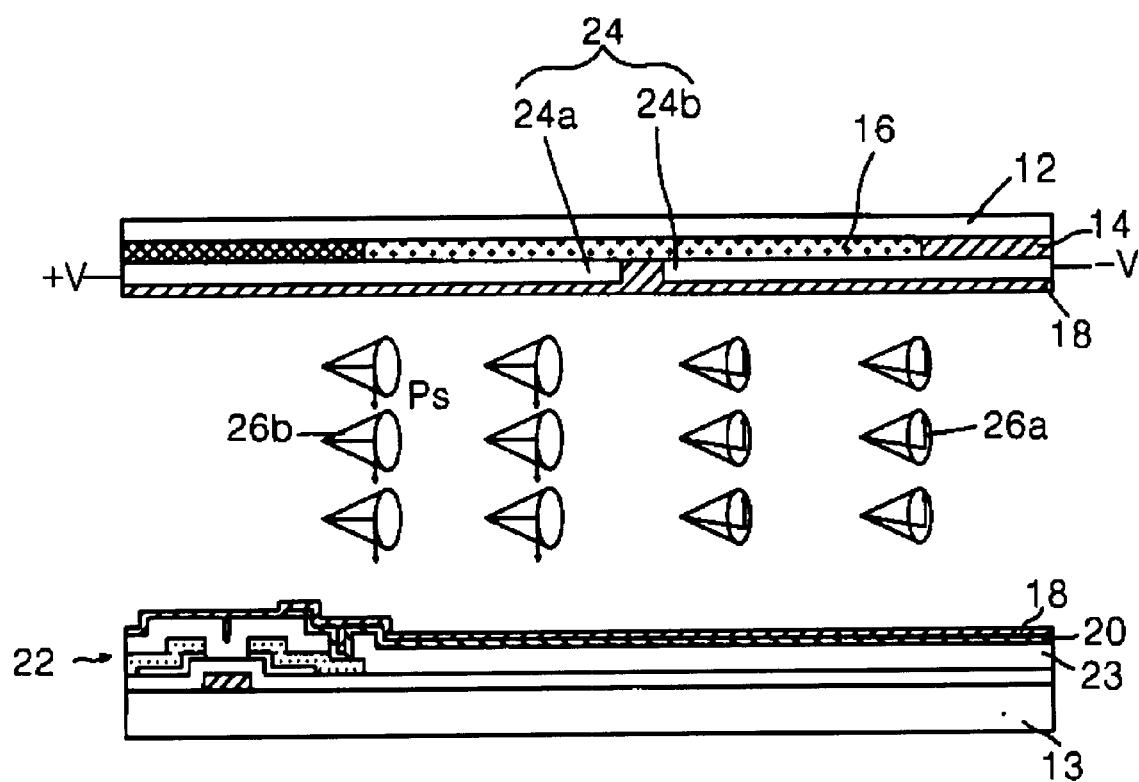

A method of fabricating a liquid crystal display device will now be explained with reference to FIGS. 8A and 8B. FIG. 8A and FIG. 8B are sectional views for explaining a method of fabricating a half V-shape FLC display device, an exemplary liquid crystal display device, according to an embodiment of the present invention.

Referring to FIG. 8A, in the exemplary half V-shape FLC display device fabricating method, an electric layer 24 is formed on an upper substrate 12 that is provided with color filter 16 and black matrix 14. The electric layer 24 is then patterned using a mask to provide a first common electrode 24a and a second common electrode 24b. An alignment film 18 is formed on the first and second common electrodes 24a and 24b. A lower substrate 13 provided with a passivation layer 23 and a thin film transistor 22 with a pixel electrode 20 and an alignment film 18 formed thereupon. The alignment film 18 formed on the upper substrate 12 and the lower substrate 13 are aligned in a desired state by a rubbing process. The upper substrate 12 and the lower substrate 13 are joined opposite to each other, and liquid crystal layer 26 are injected therebetween. The liquid crystal layer 26 injected between the upper substrate 12 and the lower substrate 13 are re-arranged in two stable states 26a and 26b having two upward/downward directions with an axis in a normal line of a smectic layer (not shown) by the alignment film 18 aligned in a desired state. As described above, heat is applied to the LCD panel that is arranged with the liquid crystal layer 26 being mixed in the two stable states 26a and 26b, to thereby raise the temperature of the LCD panel to a first level. As a result of the raised temperature, the liquid crystal layer 26 are changed into the nematic (N*) phase. Subsequently, as shown in FIG. 8B, a voltage "+V" applied to the first common electrode 24a is set to be higher than a voltage applied to the pixel electrode 20, thereby allowing the liquid crystal layer 26 changed into the nematic (N*) phase to be unilaterally arranged in parallel. Further, a voltage "−V" applied to the second common electrode 24b is set to be lower than a voltage applied to the pixel electrode 20, thereby allowing the liquid crystal layer 26 changed into the nematic (N*) phase to be arranged in parallel in a direction corresponding to the liquid crystal layer 26 re-arranged within the first common electrode 24a. At the same time, the temperature of the LCD panel is lowered to a second level. As a result, the liquid crystal layer 26 having the nematic (N*) phase arranged unilaterally in parallel by an external voltage changes into the SmC* phase at a desired temperature to stabilize an arrangement state of the liquid crystal layer 26. Accordingly, each liquid crystal cell is divided between the first common electrode 24a and the second common electrode 24b to provide two domains in which the liquid crystal layer are arranged in the upward direction 26a and the downward direction 26b with an axis at the normal line of the smectic layer. In other words, in each liquid crystal cell, there are formed two domains having spontaneous polarization directions Ps of the liquid crystal layer 26 different to each other.

Figure 9A:
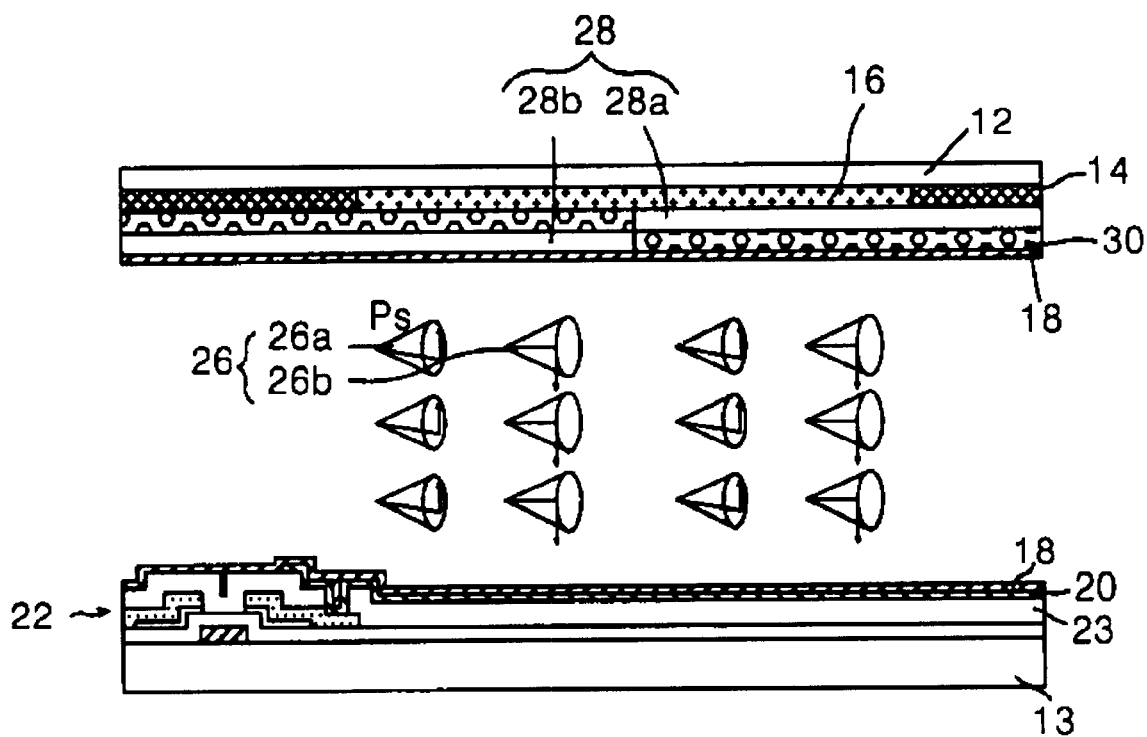
FIG. 9A and FIG. 9B are section views for explaining a method of fabricating a half V-shape FLC display device according to a second embodiment of the present invention.
Figure 9B:
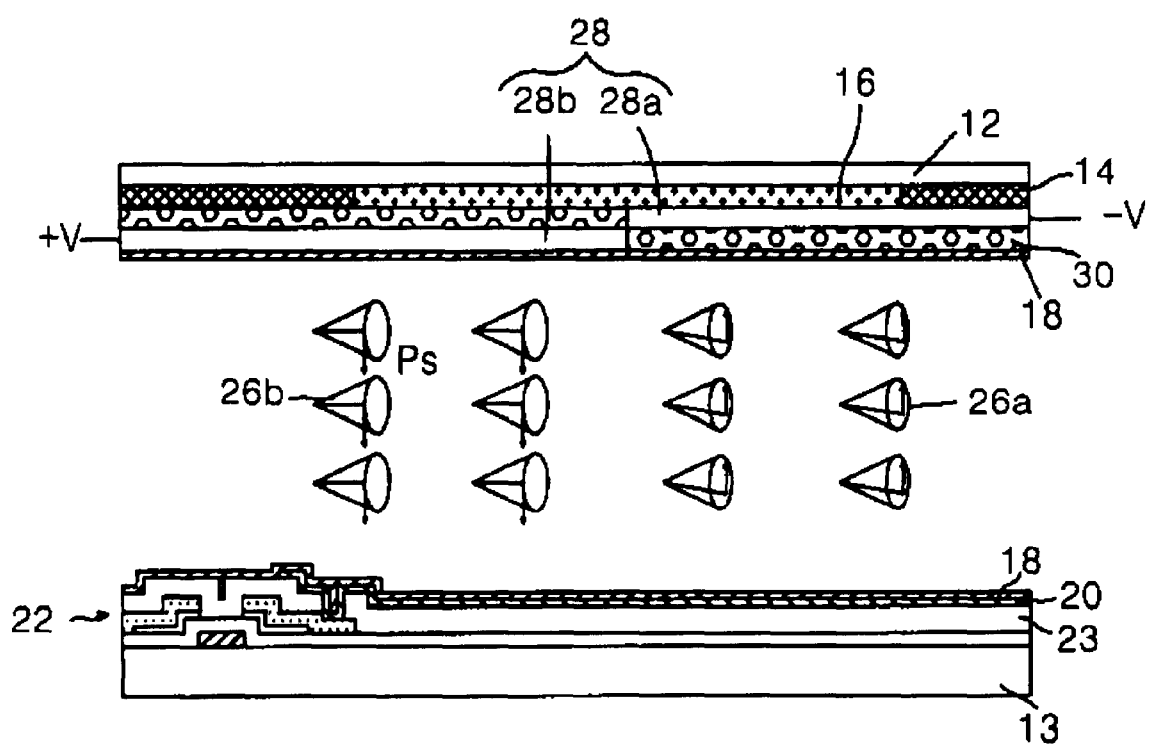

A method of fabricating a liquid crystal display device will now be explained with reference to FIGS. 9A and 9B. FIG. 9A and FIG. 9B are sectional views for explaining a method of fabricating a half V-shape FLC display according to another embodiment of the present invention.

Referring to FIG. 9A, in the present invention of half V-shape FLC display device fabricating method, an electric layer 28 is deposited on an upper substrate 12 which is provided with color filter 16 and black matrix 14. Then, a portion of the electric layer 28 is removed using a mask, thereby providing a first common electrode 28a. An insulating film 30 is entirely coated on an upper substrate 12, which is provided with the first common electrode 28a. After the electric layer 28 is entirely coated on the upper substrate 12 with the insulating film 30, a portion of the electric layer 28 overlapping with the first common electrode 28a is removed using a mask, thereby providing a second common electrode 28b.

An alignment film 18 is entirely disposed on the upper substrate 12, which is provided with the second common electrodes 28b. On a lower substrate 13 provided with a passivation layer 23 and a thin film transistor 22, a pixel electrode 20 and an alignment film 18 are formed. The alignment film 18 formed on the upper substrate 12 and the lower substrate 13 are aligned in a desired state by a rubbing process. The upper substrate 12 and the lower substrate 13 are joining oppositely to each other. Then, liquid crystal layer 26 mixed with a photo-hardening material 34 in a desired ratio are injected therebetween. The liquid crystal layer 26 injected between the upper substrate 12 and the lower substrate 13 are re-arranged in two stable states 26a and 26b, each having two upward/downward directions with an axis on a normal line of a smectic layer (not shown) by the alignment film 18 aligned in a desired state. Subsequently, heat is applied to the LCD panel that is arranged with the liquid crystal molecules 26 being mixed in the two stable states 26a and 26b to raise the temperature of the LCD panel to a first level. As a result, the liquid crystal layer 26 are changed into the nematic (N*) phase. Then, as shown in FIG. 9B, a voltage "+V" is applied to the first common electrode 28a is set to be higher than a voltage applied to the pixel electrode 20, thereby allowing the liquid crystal layer 26 converted into the nematic (N*) phase to be unilaterally arranged in parallel. Further, a voltage "−V" applied to the second common electrode 28b is set to be lower than the voltage applied to the pixel electrode 20, thereby allowing the liquid crystal layer 26 changed into the nematic (N*) phase to be arranged in parallel in a direction corresponding to the liquid crystal layer 26 re-arranged within the first common electrode 28a. At the same time, the temperature of the LCD panel is lowered to a second level, so that the liquid crystal layer 26 having the nematic (N*)

phase arranged unilaterally in parallel by an external voltage transforms into the SmC* phase at a desired temperature to stabilize an alignment state of the liquid crystal layer 26. Accordingly, each liquid crystal cell is divided between the first common electrode 28a and the second common electrode 28b to provide two domains in which the liquid crystal layer is arranged in the upward direction 26a and the downward direction 26b around an axis perpendicular to the smectic layer.

Figure 10A:
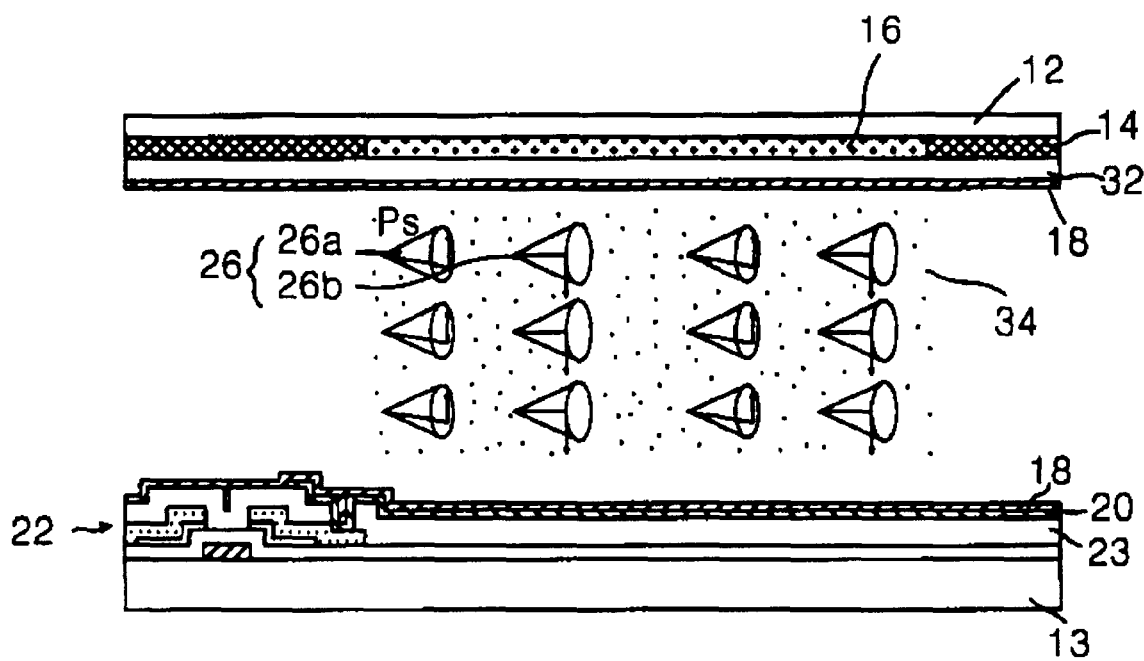
FIG. 10A to FIG. 10C are section views for explaining a method of fabricating a half V-shape FLC display device according to a third embodiment of the present invention.
Figure 10B:
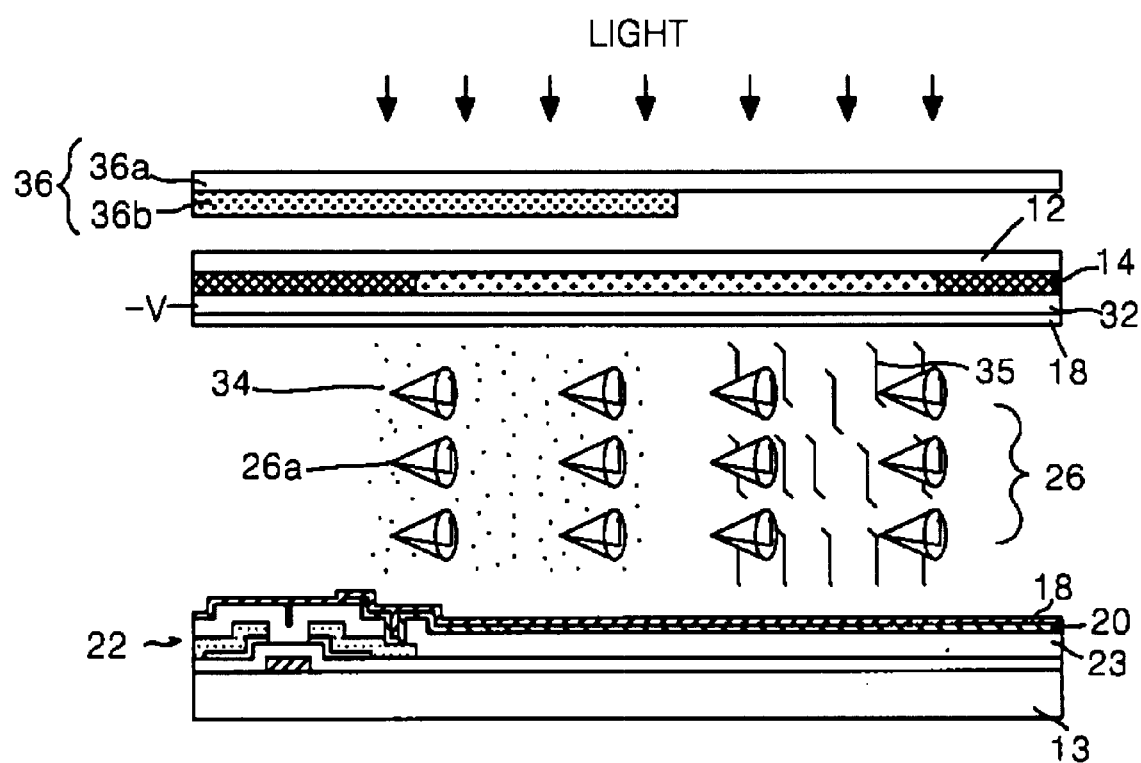
Figure 10C:
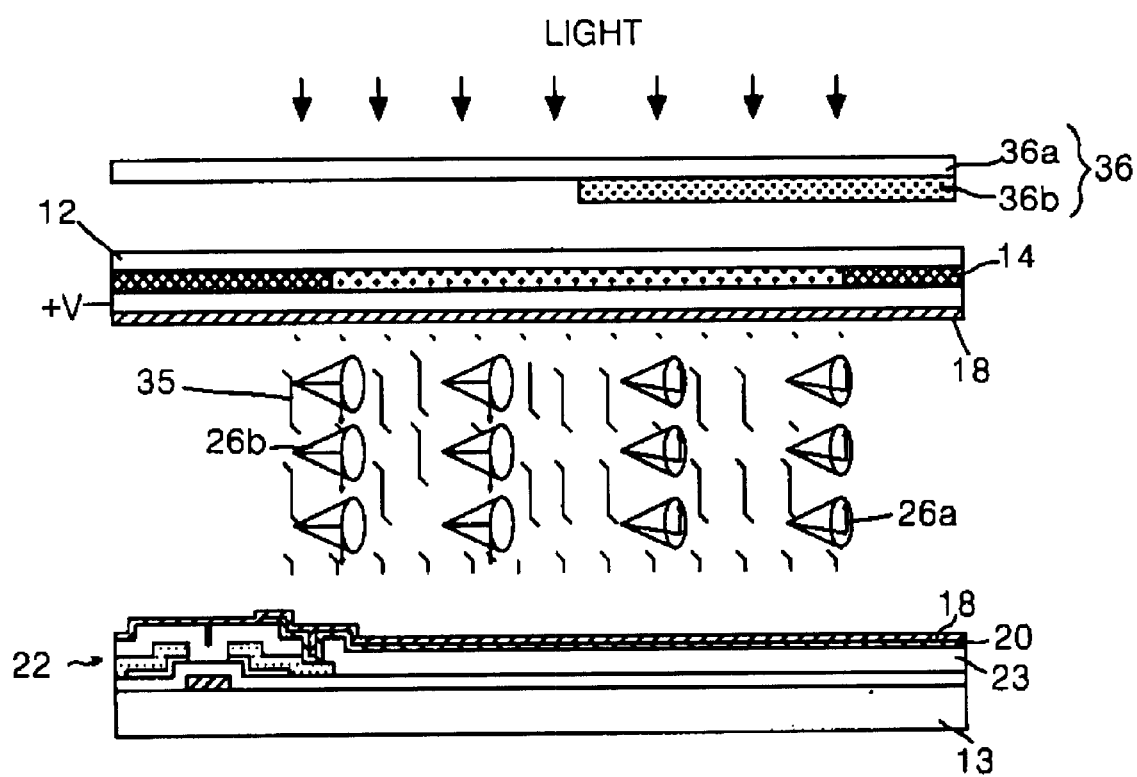
Figure 11:
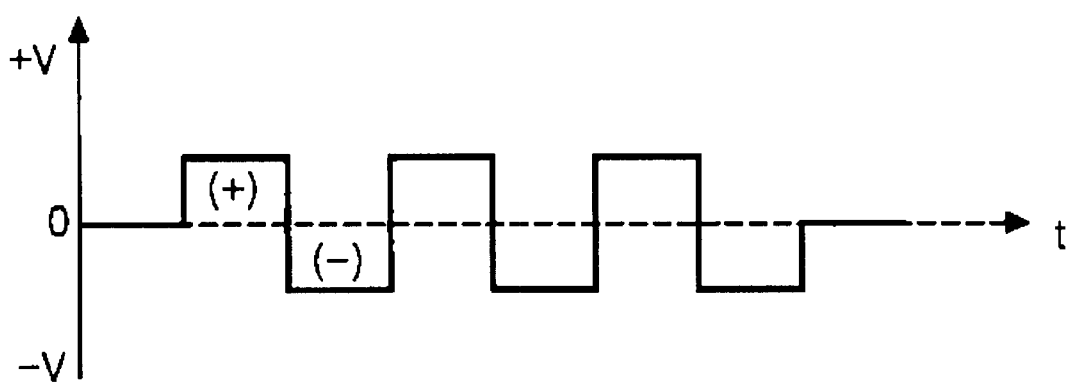
FIG. 11 is a waveform diagram of a voltage signal applied to the half V-shape FLC display device according to an embodiment of the present invention.

A method of fabricating a liquid crystal display device will now be explained with reference to FIGS. 10A to 10C. FIG. 10A to FIG. 10C are sectional views for explaining a method of fabricating a half V-shape FLC display device according to another embodiment of the present invention.

Referring to FIG. 10A, in the present half V-shape FLC display device fabricating method, an upper substrate 12 is provided with a color filter 16, black matrix 14, a common electrode 32 and an alignment film 18. A lower substrate 13 is provided with a thin film transistor 22, a passivation layer 23, a pixel electrode 20 and an alignment film 18, which are individually prepared. The alignment film 18 formed on the upper substrate 12 and the lower substrate 13 are aligned in a desired state by a rubbing process. The upper substrate 12 and the lower substrate 13 are joining oppositely to each other. Then, liquid crystal layer 26 and a photo-hardening material 34 are mixed at a desired ratio and then injected therebetween. The liquid crystal layer 26 injected between the upper substrate 12 and the lower substrate 13 are re-arranged in two stable states 26a and 26b having two upward/downward directions with an axis perpendicular on a normal line of a smectic layer (not shown) by the alignment film 18 aligned in a desired state. Subsequently, heat is applied to the LCD panel that is arranged with the liquid crystal layer 26 being mixed in the two stable states 26a and 26b, thereby raising the temperature of the LCD panel to a first level. As a result of the high temperature, the liquid crystal layer 26 are changed into the nematic (N*) phase. Then, as shown in FIG. 10B, a voltage "−V" lower than a voltage at the pixel electrode 20 is applied to the common electrode 32, thereby allowing the liquid crystal layer 26 to be converted into the nematic (N*) phase to be unilaterally arranged in parallel. At the same time, the temperature of the LCD panel is lowered to a second level, so that the liquid crystal layer 26 having the nematic (N*) phase arranged unilaterally in parallel by an external voltage transforms into the SmC* phase at a desired temperature to stabilize an liquid crystal alignment state. A mask 36 having a transparent substrate portion 36a and an opaque metal portion 36b is provided so as to cover the upper substrate 12 unilaterally arranged with the liquid crystal layer 26. Then, a light is irradiated onto the mask 36. At this time, a light emitted from the exterior is transmitted through the transparent substrate portion 36a of the mask 36 while it is prevented from being transmitted through the opaque metal portion 36b. For this reason, the light emitted from the exterior is irradiated only onto a portion of the upper substrate excluding a portion covered with the opaque metal portion 36b. The light irradiated only onto a portion of the upper substrate 12 transmits through the upper substrate 12 to be irradiated onto the liquid crystal layer 26 and the photo-hardening material 34 that are mixed at a desired ratio. In response to this light, the photo-hardening material 35 becomes a network phase. As a result of the photo-hardening material 35 forming the network phase in response to the light, the liquid crystal layer 26 are cured into a SmC* phase state arranged in parallel in an upward direction 26a with an axis on a normal line of the smectic layer.

Thereafter, heat is again applied to the LCD panel to raise the temperature of the LCD panel to a third level. By raising the temperature to the third level, only the liquid crystal layer 26 at an uncured area of the photo-hardening material 35 are changed into the nematic (N*) phase. Furthermore, as shown in FIG. 10C, a voltage "+V" higher than a voltage at the pixel electrode 20 is applied to the common electrode 32, thereby allowing the liquid crystal layer 26 having the nematic (N*) phase to be re-arranged in a direction different from the liquid crystal layer 26 within the common electrode 32 supplied with a voltage "−V" lower than a voltage applied to the pixel electrode 20. At the same time, the temperature of the liquid crystal display panel is lowered to a fourth level, so that the liquid crystal layer 26 having the nematic (N*) phase arranged unilaterally in parallel by the external voltage transforms into the SmC* phase at the desired temperature to stabilize a liquid crystal alignment state. Next, a light is irradiated onto the upper substrate 12 at an area in which the liquid crystal layer 26 having the SmC* phase and the uncured photo-hardening material 35 exist by way of a mask 36 having a transparent substrate portion 36a and an opaque metal portion 36b. The light irradiated onto the upper substrate 12 transmits through the upper substrate 12 and then irradiates onto the liquid crystal layer 26 and the uncured photo-hardening material 34 that are mixed at a desired ratio. In response to this light, the photo-hardening material 35 becomes a network phase. As a result of the cured photo-hardening material 35, the liquid crystal layer 26 are cured into a SmC* phase state arranged in parallel in an upward direction 26a around an axis perpendicular to the smectic layer. As a result, each liquid crystal cell has two domains in which the liquid crystal layer is arranged in the upward direction 26a and the downward direction 26b around an axis perpendicular to the smectic layer. The photo-hardening material 35 can be a monomer or an oligomer.

Figure 12:
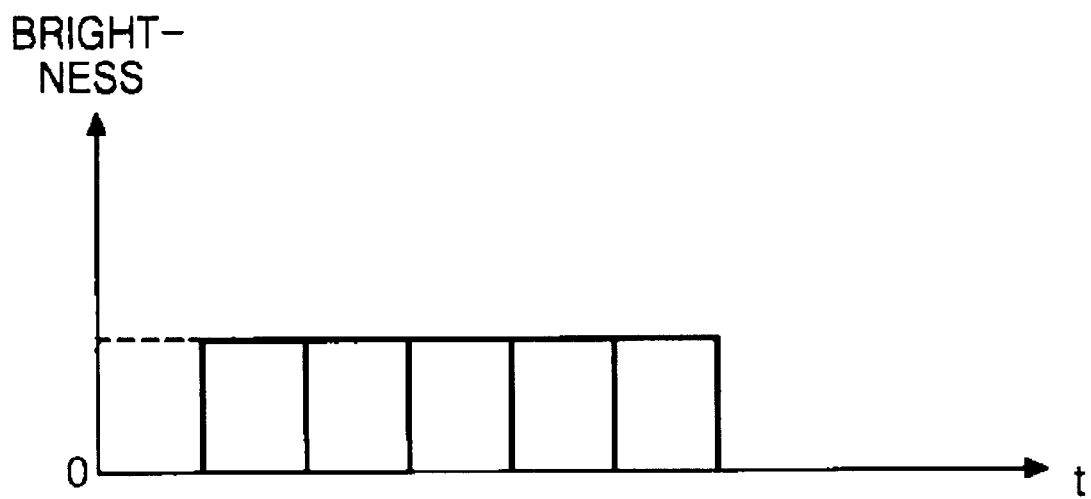
FIG. 12 is a brightness characteristic diagram of the half V-shape FLC display device shown according to an embodiment of the present invention related with the voltage waveform shown in FIG. 11.

As described above, in the half V-shape display device according to the present invention, two domains having the spontaneous polarization direction of the liquid crystal layer arranged in a different direction are provided within one liquid crystal cell so that a liquid crystal alignment state of each liquid crystal can simultaneously include both the black state and the white state. When a field-inversion electric field, in which a positive (+) electric field is alternated with a negative (−) electric field, is applied to such a two-domain half V-shape FLC display device as shown in FIG. 12, the black state and the white state are alternately operated without a brightness change of the display to prevent flicker in the prior art. Therefore, in the half V-shape display device according to the present invention, since it is not a necessary of driving in a high speed for a prevention of the flicker, a driver IC costs down. Also, a larger viewing angle can be obtained by a relative compensation of the two domains. As a result, according to the present invention, it becomes possible to prevent flicker and increase the viewing angle.

It will be apparent to those skilled in the art that various modifications and variations can be made in the liquid crystal display device and in the method for fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   a second substrate;

a first alignment layer on the first substrate;

a first electrode on the second substrate, to first electrode being divided into at least two separate portions overlaying a pixel electrode;

a second alignment layer on the second substrate; and a ferroeloctric liquid crystal layer between the first and second substrates, the molecules of the ferroelectric liquid crystal layer having at least two states having opposed alignment directions, wherein the at least two separate portions of the first electrode are of different layers.

2. The device of claim 1, wherein the at least two separate portions of the first electrode have different applied voltages.

3. A method for fabricating a liquid crystal display device, comprising:

forming a first alignment layer on a first substrate;

forming a first electrode on a second substrate, the first electrode being divided into at least two portions;

forming a second alignment layer on the second substrate;

forming a ferroelectric liquid crystal layer between the first and second substrates to form a liquid crystal display panel;

raising a temperature of the liquid crystal display panel to a first level; and applying voltages to the at least two portions, the voltages having opposite polarities, wherein to at least two portions of the first electrode are of different layers.

4. The method of claim 3, wherein the ferroelectric liquid crystal layer changes nematic (N*) phases in the step of raising a temperature.

5. The method of claim 3, wherein the ferroelectric liquid crystal layer changes to a smectic C*(SmC*) phase in the step of applying voltages.

6. The method of claim 3, wherein molecules of the ferroelectric liquid crystal layer corresponding to the at least two portions of the first electrode have different alignment directions.

7. A method for fabrication a liquid crystal display device, comprising:

forming a first alignment layer on a first substrate;

forming a first electrode on a second substrate, the first electrode being divided into at least two portions;

forming a second alignment layer on the second substrate;

forming a ferroelectric liquid crystal layer having a photo-hardenable material between the first and second substrates to form a liquid crystal display panel;

raising a temperature of the liquid crystal display panel to a first level;

applying a first voltage to the first electrode and lowering the temperature of the liquid crystal display panel to a second level;

irradiating a first light onto a first area of the liquid crystal display panel;

raising the temperature of the liquid crystal display panel to a third level such that the ferroelectric liquid crystal layer in a second area of the liquid crystal display panel has a nematic (N*) phase; and irradiating a second light onto the second area of the liquid crystal display panel.

8. The method of claim 7, wherein the first and second voltages are of different polarities.

9. The method of claim 7, wherein the ferroelectric liquid crystal layer has one of a nematic (N*) phase in the step of raising a temperature to a first level.

10. The method of claim 7, wherein the ferroelectric liquid crystal layer has a smectic C*(SmC*) phase in the step of applying a first voltage.

11. The method of claim 7, wherein the ferroelectric liquid crystal layer has a smectic C*(SmC*) phase in the step of applying a second voltage.

12. The method of claim 7, wherein the photo-hardenable material cures in the step of irradiating a first light.

13. The method of claim 7, wherein the photo-hardenable material cures in the step of irradiating a second light.

14. The method of claim 7, wherein molecules of the ferroelectric liquid crystal layer have different alignment directions corresponding to the first and second areas.

15. The method of claim 7, wherein the photo-hardenable material includes a monomer.

16. The method of claim 7, wherein the photo-hardenable material includes an oligomer.

* * * * *